Dec. 12, 1967          G. DOUCET          3,357,043
     DEVICE FOR THE EJECTION AND REMOVAL OF LIGHT
           OBJECTS MANUFACTURED BY MOLDING
Filed April 4, 1966                    2 Sheets-Sheet 1
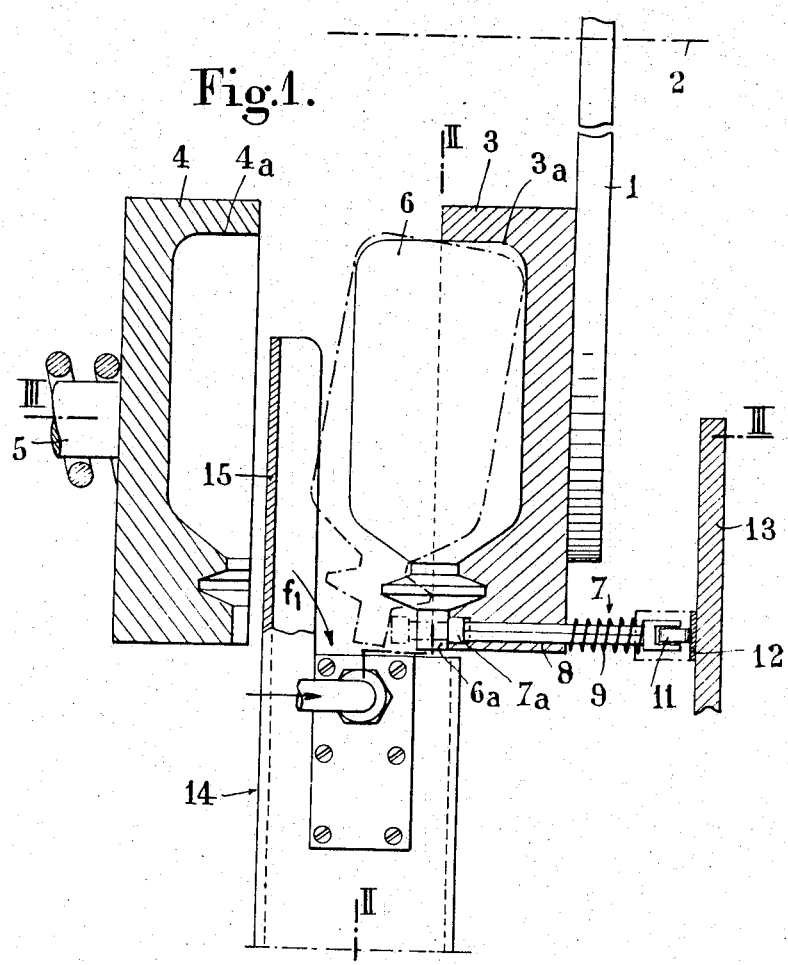
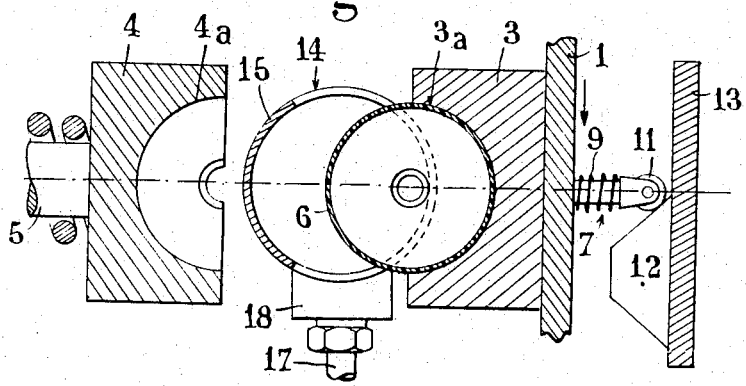

United States Patent Office 3,357,043
Patented Dec. 12, 1967

3,357,043
DEVICE FOR THE EJECTION AND REMOVAL OF LIGHT OBJECTS MANUFACTURED BY MOLDING
Gilles Doucet, Saint-Jean-Vedas, France, assignor to Georges Lesieur & Ses Fils, Societe Anonyme, Paris, France
Filed Apr. 4, 1966, Ser. No. 539,953
Claims priority, application France, Apr. 12, 1965, 12,844, Patent 1,453,858
1 Claim. (Cl. 18—2)

The present invention relates to a method for the ejection and removal of light objects manufactured by molding, more particularly bottles of plastic material, characterized in that, after opening of the mold and hardening of the molded object, a portion of this object is disengaged from the impression of the mold by means of an ejector and the thus disengaged portion is placed in a stream of air sucked into a pipe of a pneumatic conveyor, so as to draw the molded object into said pipe.

It is another object of the invention to provide a device for the ejection and removal of light objects manufactured by molding, such as objects made of plastic material, aluminium, etc., characterized in that it comprises a suction head formed at the end of a removal pipe and projecting into the open mold so as to be placed as close as possible to the molded objects, and ejector movably mounted in the mold to cause the disengagement from the impression of the mold of a portion of the molded object located near the suction head, and a device for creating a negative pressure in the suction head so as to draw the molded object into said suction head.

If the mould is fixed, the suction head may be mounted on a movable support to be inserted between the two sections of the mould when the latter is open. On the other hand, in the case wherein the moulds are mounted on a rotary support, the suction head is mounted in a fixed position at the evacuation station and it is disposed slightly away from the trajectory followed by the molded objects.

The method and device according to the invention have the advantage of eliminating any manual intervention for the removal of the molded objects in a continuously operating molding machine, and therefore, any risk of accident.

A specific form of embodiment of the invention will be described hereafter by way of non-limiting example, with reference to the attached drawing, in which:

FIGURE 1 is a longitudinal section, partly in elevation, of an ejection and removal device according to the invention, used in conjunction with a rotary molding machine, for the manufacture of plastic bottles.

FIGURE 3 is a cross-sectional view taken upon the line III—III of FIGURE 1.

Figure 2:
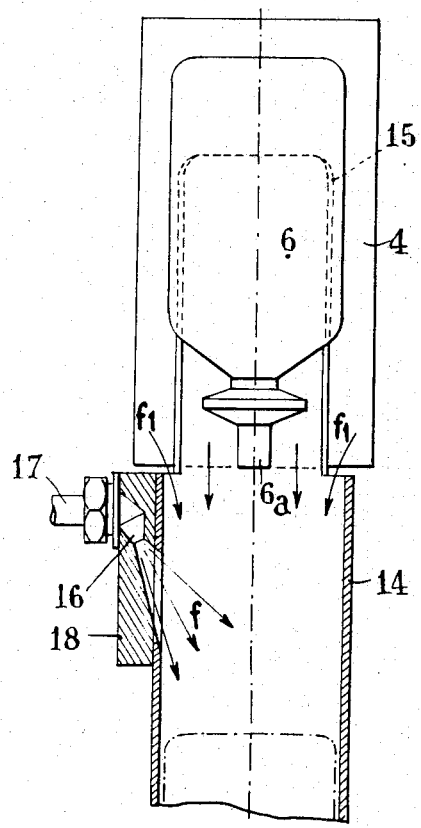
FIGURE 2 is a longitudinal section taken upon the line II—II of FIGURE 1.
Figure 4:
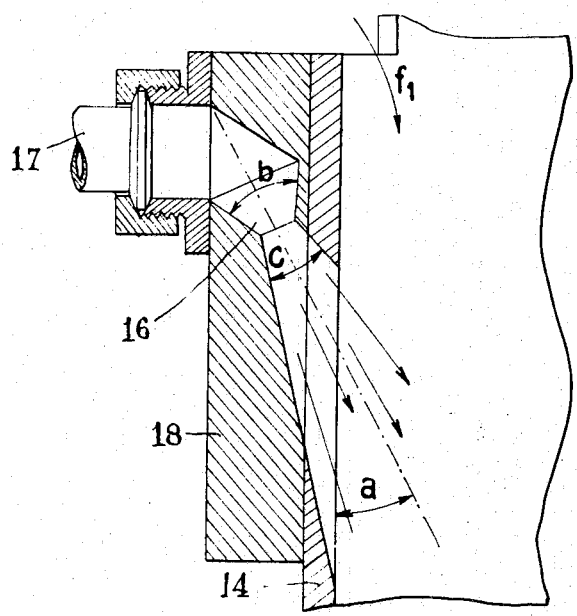
FIGURE 4 is a fragmentary longitudinal section of the device used for creating a vacuum in the suction head.

The method and device according to the invention will be described in the following, with reference to a molding machine of the rotary type, but it is obvious that they may just as well be applied to any other type of molding machine.

A type of rotary molding machine is described, for example, in the French Patent No. 1,392,527 of Nov. 21, 1963. Only the component elements of this machine which are necessary for the understanding of the invention have been illustrated in the drawing. The machine comprises essentially a circular plate 1, rotatably driven about a horizontal axis 2 by suitable means not shown. This plate 1 carries at its periphery, at regular intervals, a plurality of molds each consisting of two elements, namely a fixed half-mould 3 integral with the rotary plate 1, and a movable half-mould 4 which may be displaced with respect to the fixed half-mold 3 by means of a rod 5 moved by suitable means not shown.

The half-molds 3 and 4 present impressions 3a and 4a respectively, corresponding to the shape of the molded object, in the present case of a bottle 6 of plastic material. This bottle 6 is illustrated as it comes out of the mold, that is to say, with its neck plug 6a.

An ejector 7 is slidably mounted in a housing 8 of the fixed half-mold 3. The head 7a of this ejector 7 may project into the impression 3a of mold 3, at any point of the latter. The ejector 7 is preferably disposed, as shown in the drawing, in such a manner that said head 7a will act on the neck plug 6a of the bottle. Thus, once the neck plug 6a has been removed in a subsequent step, no trace of the impact appears on the surface of the finished bottle.

The ejector 7 is held in the inoperative position, wherein its head 7a does not project into the impression 5a, by means of a spring 9. The ejector 7 carries at its outer end a roller 11 rolling on an ejection ramp 12 disposed at a suitable location on the frame 13 of the machine.

The device for the removal of the molded bottles comprises essentially a suction head 14 which constitutes the end of a removal pipe of a pneumatic conveyor. The longitudinal axis of the suction head 14 is substantially parallel to the axis of the bottle 6 when the latter reaches its closing position.

The end of the suction head 14 is extended by a guide screen 15 constituted by a portion of the cylinder. The directrix of the cylindrical surface of the screen 15 is a circular arc of about 120°, as shown in FIGURE 3.

A negative pressure is created at the inlet of the suction head 14 by means of an injector 16 connected through a pipe line 17 to a source of compressed air. This injector 16 is mainly formed in a small plate 18 secured externally of the suction head 14. The injector 16 consists of a convergent-divergent formed partly in the small plate 18 and partly, at least as concerns the divergent, in the wall of the pipe constituting the head 14. The jet of compressed air penetrates into the head 14 in the form of an acute angle inlet cone. This arrangement gives the maximum suction effect at the inlet of the head 14.

In a specific form of embodiment of the injector the angle $b$ of the convergent portion was assumed to be equal to 60° and the angle $c$ of the divergent portion was assumed to be equal to 30°. Of course, these values must not be considered as limiting.

The jet of compressed air injected into the suction head 14, as indicated by the arrows $f$, causes the induction, by suction effect, on a secondary stream of air sucked into the head 14 in the direction of the arrows $f1$.

The device according to the invention operates as follows:

When a mould in which a molded bottle has been sufficiently cooled approaches the removal station, the movable half-mould 4 moves away from the fixed half-mold 3. Then, at the same time as the thus freed bottle 6 registers with the suction head 14, the roller 11 of the ejector 7 gets on the ejection ramp 12 and the head 7a of the ejector projects into the impression 3a of the mold. This action causes the disengagement of the neck plug 6a from its impression and the bottle 6 is then partially released from the impression 3a, as indicated in chain-dotted lines in FIGURE 1.

As a consequence of the partial release of the bottle 6 from the impression 3a, said bottle 6 is placed in the secondary stream of air sucked into the head 14 by suction effect. The bottle 6 is then drawn in the direction of the guide screen 15 by which it is retained and directed towards the suction head 14 through which it is carried along by the pneumatic conveyor located downstream.

Moreover, it is to be understood that the form of embodiment of the invention described hereinabove with reference to the attached drawing has been given by way of non-limiting example only, and that many modifications may be brought thereto without departing from the spirit and scope of the present invention.

What I claim is:

A rotary molding machine comprising a circular plate, means for rotationally driving said plate about a horizontal axis, a plurality of molds mounted at the periphery of the plate at regulator intervals, each of said molds comprising a fixed half-mold integral with the plate and a movable half-mold mounted for displacement relative to the fixed half-mold, for each mold a passage extending at right angles to the plane of separation of the half-molds through the fixed half-mold at a position adjacent the lower end thereof, an elongated ejector member slidably mounted in said passage, one end of the ejector member extending outside the mold, a spring biasing the ejector member to an inoperative position with the ejector member not extending into the impression defined by the fixed half-mold, a roller mounted on the end of the ejector member extending outside the mold, a ramp fixedly mounted adjacent to the path of rotation of the molds for periodic engagement with the rollers of the ejector members of the respective molds to urge the ejector member inwardly against the biasing of the spring to an operative position in which the inner end of the ejector member extends into said impression, a suction head fixedly positioned immediately beneath the plane of separation of the half-molds at the rotational position of the half-molds in which the roller of the ejector member of the mold is in engagement with the ramp, means for moving the movable half-mold from a closed position with respect to the fixed half-mold to an open position as the mold, in its rotation, approaches the suction head, a screen mounted on the suction head and extending upwardly between the half-molds in a position spaced from and facing said impression, and a jet opening into the suction head and directed downwardly with respect to the suction head, said jet comprising means defining a throughpassage which opens externally of the suction head at one of its ends and internally of the suction head at the other of its ends and diverges towards its end openings and converges intermediate its end openings and an external source of compressed gas connected to the external end opening of the throughpassage, whereby during a molding operation, each mold sequentially rotates into a position above the suction head at which position the mold is open and the ejector member is operated by the engagement of the roller at its external end with the ramp to be projected into the impression, thus loosening the molded article from the impression, the screen prevents the molded article from being urged out of alignment with the suction head by the ejector member and the molded article is drawn into the suction head by the negative pressure created therein by the jet.

References Cited

UNITED STATES PATENTS

| 2,744,286 | 5/1956 | Carpenter | 264—335 |
| 3,008,181 | 11/1961 | Fitz | 264—335 X |
| 3,099,045 | 7/1963 | Honkanen | 264—41 |
| 3,128,499 | 3/1964 | Smolenski | 18—2 |

ROBERT F. WHITE, *Primary Examiner.*

R. B. MOFFITT, R. R. KUCIA, *Assistant Examiners.*